United States Patent [19]

Börger et al.

[11] Patent Number: 5,310,416
[45] Date of Patent: May 10, 1994

[54] PROCESS AND APPARATUS FOR THE ABSORPTION OF EXPLOSIVE GASES IN A MASS TRANSFER COLUMN

[75] Inventors: Götz-Gerald Börger, Odenthal-Osenau; Uwe Listner, Hürth-Stotzheim; Günther Lüttgens, Odenthal-Osenau, all of Fed. Rep. of Germany

[73] Assignee: Bayer Aktiengesellschaft, Leverkusen, Fed. Rep. of Germany

[21] Appl. No.: 932,831

[22] Filed: Aug. 18, 1992

[30] Foreign Application Priority Data

Aug. 24, 1991 [DE] Fed. Rep. of Germany ....... 4128119

[51] Int. Cl.⁵ ............................................. B01D 35/14
[52] U.S. Cl. .................................... 95/64; 55/233; 55/360; 95/71; 95/211; 96/27; 96/52; 261/97; 261/DIG. 72
[58] Field of Search ............... 55/90, 233, 10, 122, 55/259, 360; 261/94–98, DIG. 72; 169/45, 54; 95/64, 71, 211; 96/27, 52

[56] References Cited

U.S. PATENT DOCUMENTS

| | | | |
|---|---|---|---|
| 1,785,365 | 12/1930 | Seil | 55/90 X |
| 3,397,513 | 8/1968 | Ephraim, Jr. et al. | 55/233 X |
| 3,481,115 | 12/1969 | Brandt | 55/233 |
| 3,502,596 | 3/1970 | Sowards | 55/90 X |
| 3,792,571 | 2/1974 | Waki et al. | 55/233 X |
| 4,952,247 | 8/1990 | Schrader et al. | 55/90 X |
| 5,024,686 | 6/1991 | Lerner | 55/259 |

FOREIGN PATENT DOCUMENTS

| | | |
|---|---|---|
| 0817130 | 8/1937 | France . |
| 2332050 | 6/1977 | France . |
| 53-42181 | 4/1978 | Japan . |
| 2067090 | 7/1981 | United Kingdom . |
| 2086259 | 5/1982 | United Kingdom . |

OTHER PUBLICATIONS

Derwent AN 76-82097X Abstract of Japanese Patent No. 51-104598, 1976.
Derwent AN 77-51090Y Abstract of Japanese Patent No. 52-068068, 1977.

*Primary Examiner*—Richard L. Chiesa
*Attorney, Agent, or Firm*—Sprung Horn Kramer & Woods

[57] ABSTRACT

The separation process and apparatus is based on conducting the explosive gas or vapour through a mass transfer column which is charged with an absorbent and filled with an electrically conductive packing. The packing (2) of the mass transfer column (1) must be earthed and have such a dense lattice spacing that no electric charge sufficient for ignition can accumulate at any point in the packing. Under these conditions, a non-conductive electrostatically chargeable liquid may be used as absorption liquid.

7 Claims, 3 Drawing Sheets

PROCESS AND APPARATUS FOR THE ABSORPTION OF EXPLOSIVE GASES IN A MASS TRANSFER COLUMN

This invention relates to a process for the absorption of explosive gases or vapours which are passed through a mass transfer column charged with an absorbent.

Electrostatically chargeable liquids are occasionally used as absorbents for the separation of gases or vapours. Absorption is generally based on a purely physical bond without chemical reactions. The aim is to obtain degrees of separation >99%. It is therefore necessary to use a multistage countercurrent absorber. In order to keep this as compact as possible and operate it with the least possible pressure drop at the gas end, filling bodies having highly perforated surfaces or regularly arranged packings are used. The absorbent liquid is applied to such packings from above after it has passed through a pump and at least one heat exchanger.

It has been found that electrostatic charges cannot be avoided under these conditions if the absorbent has a sufficiently high specific resistance, e.g. of $>10^{10}\Omega$ cm. It is well known that the presence of high electrostatic charges gives rise to sparks and electric breakdown voltages which are a serious source of danger when explosive or inflammable gases or vapours are passed through the mass transfer column.

It is an object of the present invention to carry out the separation of explosive or inflammable gases, vapours or gas mixtures in a mass transfer column under such conditions, using insulating, electrostatically chargeable absorbents, that there is no hazard due to ignition resulting from electrostatic discharge sparks. In particular, it is necessary to ensure that no ignitable discharges can occur at the points at which the absorbent is in contact with gases which may be inflammable.

This problem is solved according to the invention with a non-conductive, electrostatically chargeable absorption liquid by filling the mass exchange column with an electrically conductive, earthed packing whose packing density is so great that no electric charge sufficient for igniting a mixture of Ex-Class IIC can accumulate at any point in the packing. Gas mixtures of Ex-Class IIC are, for example, hydrogen/oxyhydrogen gas, acetylene/air or carbon disulphide/air.

In practice the packing is made so dense that the distance to the next adjacent mass transfer surface is less than 25 mm, preferably less than 15 mm, at every point on the absorbent surface of the packing through which the material flows.

According to a preferred embodiment, the absorbent is supplied to the mass transfer column by way of pipes which are completely filled with the absorbent liquid and which extend to the upper end of the packing or into the packing.

A further development is characterised in that the foot of the column packing is in a sump of accumulated absorbent in order to avoid the presence of free gas spaces interacting with the absorbent in that part of the mass transfer column which is not filled with the packing.

The gas is preferably supplied to the mass transfer column by way of a siphon type conduit which is also filled with a packing material to such a height that the absorbent does not come into contact with the free gas space above the packing at this point.

Silicone oil has been found to be a particularly suitable absorbent liquid.

The invention minimizes the risk of ignition and explosion in the separation of explosive gases, vapours or gas mixtures in mass transfer columns when insulating, electrostatically chargeable absorption liquids are used. Absorption columns can then also be used in those cases in which the risk was previously too great. In particular, it is now possible also to use highly insulating absorbent liquids whose use was previously problematic for the reasons stated above.

BRIEF DESCRIPTION OF THE DRAWINGS

The invention will now be described more fully with reference to drawings and examples. In these drawings.

DETAILED DESCRIPTION OF THE DRAWINGS

Figure 1:
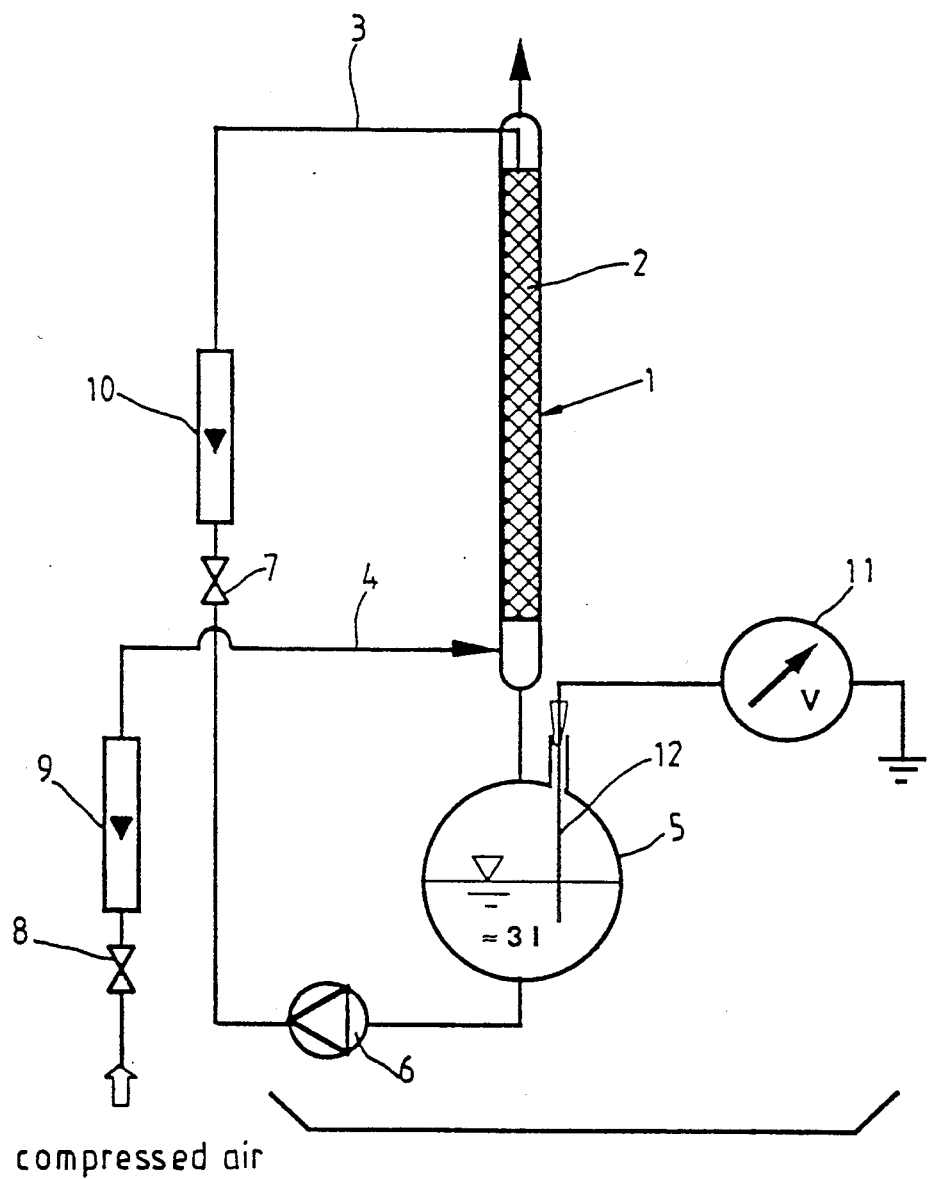
FIG. 1 represents an experimental apparatus for investigating the critical conditions for the process according to the invention.

The experimental apparatus according to FIG. 1 consists of a mass transfer column 1 filled with a packing 2 and having a connection 3 at the top end for the supply of an absorbent liquid and a connection 4 at the lower end for the supply of compressed air. Situated at the sump of the mass transfer column is a container 5 filled with silicone oil of the type of ®Baysilone M 50. The silicone oil is circulated by means of a membrane pump 6 whose output can be adjusted by the valve 7. The rate of flow of compressed air which is supplied at the lower end 4 of the mass transfer column 1 can be adjusted by the valve 8. Flow meters in the pipes conducting compressed air and silicone liquid are shown at 9 and 10. The charge on the silicone oil in container 5 can be measured against earth by a voltage measuring apparatus 11 (electrometer). The packing 2 is a commercial packing of refined steel fabric 1000 mm in height and 50 mm in diameter in which the maximum free space between the mass transfer surfaces is 15 mm.

20 Liters of ®Baysilone M 50 silicone oil were passed through the mass transfer column 1 and 7 m³/h of air were passed in countercurrent thereto. After an operating time of 10 minutes, a maximum charge of $-100$ kV/m was measured on the outside of the glass column 1 in the region of the packing 2. At the same time, the charges on the outside of the receiver 5 were $+10$ kV/m. No measurable charge could be detected in the region of transition of column 1 to receiver 5. These measurements were all obtained without the packing 2 being earthed. As soon as the packing 2 was earthed, no charges were measurable. When the earthing was again removed, the charges increased from above downwards in proportion to the passage of absorbent through the column.

According to previous experience with other electrostatically chargeable liquids, the addition of submicron-size $SiO_2$ particles would increase the charging voltage by up to two orders of magnitude under otherwise the same conditions owing to the creation of large interfaces between the liquid and the particles. $SiO_2$ was added to the silicone oil after a period of steady operation of 30 minutes under the condition described above. It was unexpectedly found that the size of the charge did not change compared with the first experiment. The electric field could again be removed quantitatively by earthing the packing 2. When the voltage was measured at an electrode 12 immersed in the oil in the receiver 5 while the packing 2 was earthed, the voltage was found to be +40 Volt.

No changes in the measurements were found even after the installation had been in operation for one and a half hours. Even when the silicone oil supplied was fresh from the factory, the charges were identical to the previous results. The field strengths remained lower than expected by a factor of 100.

No signals due to discharges inside the column could be detected by a high frequency receiver capable of receiving all electromagnetic waves in its vicinity and detecting them acoustically. This sensitive method of measurement is based on the fact that ignitable electrostatic discharges invariably produce electromagnetic waves. From this negative result it may be concluded that the electrostatically charged oil inside the packing 2 produces no detectable electrostatic discharges. This result is attributable to the great density of the packing 2. Owing to the small lattice distances in the packing, no charges sufficient to produce charge equalisation by sparkover can accumulate at any point.

Figure 2:
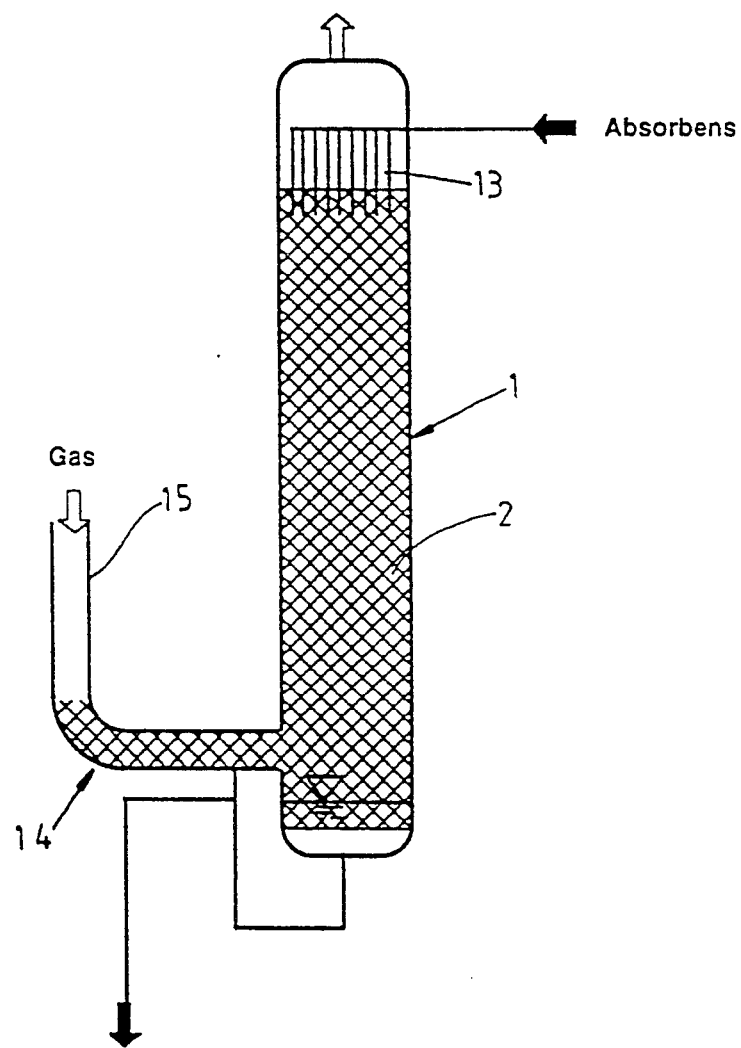
FIG. 2 shows an absorption column with special devices for the supply of the gas and of the absorbent liquid for carrying out the process according to the invention and FIG. 3 shows the relative positions of the mass transfer surfaces in the smallest cell of a mass transfer packing.

On the basis of this finding, the apparatus shown in FIG. 2 was developed to avoid ignitable sparks produced by electrostatic discharges.

Figure 3:
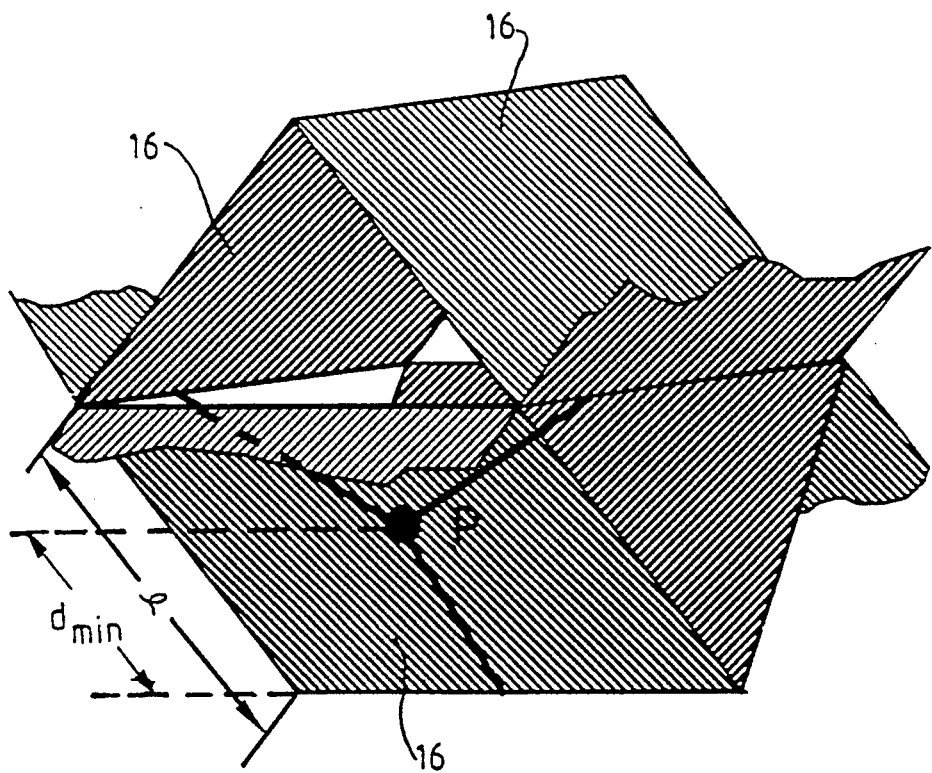

A conventional cylindrical, upright mass transfer column 1 is densely packed in its interior with electrically conductive filling bodies or regularly arranged packings, e.g. of metal, a graphite-like material or an electrically conductive synthetic resin having a specific surface area e.g. of 500 m$^2$/m$^3$. The geometry of an elementary cell of this packing is shown in FIG. 3.

The packing 1 and column 2 are earthed. In choosing a suitable packing, the important criterion to observe is that the distance between any point on the absorbent surface formed on the gas side in the process of absorption and the nearest adjacent point of a solid surface separated therefrom by a layer of gas should be smaller than an empirically determinable critical distance $d_{min}$. The limiting distance $d_{min}$ is defined by the condition that at distances $d < d_{min}$, the electric energy resulting from an accumulation of charge at any point of the packing remains below a limiting value which would be powerful enough to ignite an inflammable mixture of Ex-Class IIC. Typical examples of inflammable mixtures of Ex-Class IIC are hydrogen/oxyhydrogen gas, acetylene/air and carbon disulphide/air (see e.g. the book by Nabert, Schon: Sicherheitstechnische Kennzahlen, Deutscher Eichverlag, Berlin). This condition can be fulfilled in practice if the distance (lattice distance) between two adjacent mass transfer surfaces in the packing is less than 25 mm, preferably less than 15 mm. The packing must therefore be chosen with these conditions in mind for carrying out the process according to the invention. In the example illustrated in FIG. 2, the free distances within the packing were certainly less than 20 mm.

The absorbent used was the same as in the experiment illustrated in FIG. 1, namely an electrically highly insulating silicone oil of type ®Baysilone M 50. The absorbent was supplied to the head of the packing 2 from a pipe manifold 13, care being taken to ensure that the pipes of the manifold 13 extending into the packing were kept filled with absorbent liquid. It was thereby possible to fulfil the condition at the head of the packing 2 that no free liquid layers having a distance greater than 20 mm from the nearest earthed surface in any direction through the gas space could develop. At the foot of the column, the absorbent is filled right into the packing 2 by means of a siphon 14. Free gas spaces interacting with the absorbent are thereby also prevented from forming in the lower end of the mass transfer column which is not filled with packing. The gas mixture to be purified is introduced into the siphon pipe, which is also filled with packing material so that no contact can take place between the absorbent liquid and the gas mixture in the free gas space of the pipe 15.

The operation of such a mass transfer column is not subject to any additional restrictions compared with conventional absorption columns. Thus, for example, when ®Baysilone M 50 silicone oil is used as absorbent and BX packings of Sulzer AG are used in columns, operations may be carried out with a trickling density B of 10 m$^3$/m$^2$h and a gas loading factor of 1.2m/s$\sqrt{kg/m^3}$.

FIG. 3 shows an elementary cell of the packing having layers 16 orientated at rightangles to one another and folded at rightangles. The thick black lines in the drawing connect the most unfavourably situated point P of the absorbent layer with the nearest adjacent mass transfer surfaces. The observance of a critical limiting value (upper limit $d_{min}$) has already been mentioned above. The lattice distance of the packing (distance between two adjacent mass transfer surfaces) is indicated by the reference 1.

We claim:

1. A process for the absorption of explosive gases or vapours which are passed through a mass transfer column charged with an absorbent and filled with an electrically conductive packing, wherein
   a) the packing of the mass transfer column is earthed,
   b) the absorbent used is a nonconductive, electrostatically chargeable liquid and
   c) the packing has such a dense lattice structure that no electric charge sufficient for igniting a mixture of Ex-Class IIC gases can accumulate at any point in the packing.

2. A process according to claim 1, wherein the condition that the distance to the nearest adjacent mass transfer surface is less than 25 mm is fulfilled at every point of the absorbent surface in the packing through which the gases or vapours flow.

3. A process according to claim 1 wherein the absorbent is supplied to the column by way of pipes which are completely filled with the liquid and extend to the upper end of the packing or into the packing.

4. A process according to claim 1 wherein the foot of the column packing stands in a sump of accumulated absorbent so that free gas spaces interacting with the absorbent are avoided in the part of the column which is not filled with packing.

5. A process according to claim 1 wherein the supply of gas to the column takes place via a siphon pipe which is also filled with a packing material to such a height that the absorbent does not come into contact with the free gas space above the part which is filled with packing.

6. A process according to claim 1 wherein the absorbent used is silicone oil.

7. A column for the absorption of explosive gases or vapours wherein the column contains a regularly arranged electrically conductive packing, the lattice distance of the packing is less than 25 mm so that no electric charge sufficient for igniting a mixture of Ex-Class IIc gases can accumulate at any point in the packing, the electrically conductive packing is earthed, pipes extending to the upper end of the packing or into the packing are provided at the upper end of the column for providing and supplying an absorbent nonconductive and electrically chargeable liquid, and a siphon gas supply pipe also filled with a packing is connected to the lower end of the column. s

* * * * *